(12) United States Patent
Leng (10) Patent No.: US 10,133,445 B2
(45) Date of Patent: Nov. 20, 2018

(54) METHOD FOR SEARCHING INFORMATION, DISPLAY CONTROL SYSTEM AND INPUT DEVICE

(71) Applicant: BOE TECHNOLOGY GROUP CO., LTD., Beijing (CN)

(72) Inventor: Changlin Leng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 9 days.

(21) Appl. No.: 14/890,534

(22) PCT Filed: Apr. 16, 2015

(86) PCT No.: PCT/CN2015/076758
§ 371 (c)(1),
(2) Date: Nov. 11, 2015

(87) PCT Pub. No.: WO2016/062039
PCT Pub. Date: Apr. 28, 2016

(65) Prior Publication Data
US 2016/0291835 A1    Oct. 6, 2016

(30) Foreign Application Priority Data
Oct. 23, 2014   (CN) .......................... 2014 1 0571792

(51) Int. Cl.
G06F 3/045 (2006.01)
G06F 3/0481 (2013.01)
(Continued)

(52) U.S. Cl.
CPC ........ G06F 3/04817 (2013.01); G06F 3/0219 (2013.01); G06F 3/044 (2013.01);
(Continued)

(58) Field of Classification Search
CPC .... G06F 3/04817; G06F 3/044; G06F 3/0481; G06F 3/0483; G06F 3/04842;
(Continued)

(56) References Cited

U.S. PATENT DOCUMENTS 7,461,343 B2   12/2008  Kates
8,654,096 B2    2/2014  Yanase et al.
(Continued)

FOREIGN PATENT DOCUMENTS

| CN | 2867493 Y | 2/2007 |
|---|---|---|
| CN | 101057208 A | 10/2007 |

(Continued)

OTHER PUBLICATIONS

International Search Report of PCT/CN2015/076758 in Chinese, dated Jul. 17, 2015 with English translation.
(Continued)

*Primary Examiner* — Nicholas Lee
*Assistant Examiner* — Ngan T Pham Lu
(74) *Attorney, Agent, or Firm* — Collard & Roe, P.C.

(57) ABSTRACT

A method for rapidly searching information, a display control system and an input device, wherein the method comprises: receiving a first operating instruction (101) when an electronic device is in an operating state; displaying a first operating page on the electronic device according to the first operating instruction (102); receiving a second operating instruction, and opening an icon corresponding to a first parameter on the first operating page according to the second operating instruction to enter a first parameter selection page (103); and receiving a third operating instruction, and selecting an icon corresponding to a target parameter in first parameters on the first parameter selection page according to the third operating instruction (104). The method makes operations in the channel switching used in the existing
(Continued)

electronics device simpler, brings convenience to the users, and improves the interaction capability between the users and the electronic device.

19 Claims, 6 Drawing Sheets (51) Int. Cl.
- *G06F 3/044* (2006.01)
- *G06F 3/0483* (2013.01)
- *G06F 3/0484* (2013.01)
- *G06F 3/0485* (2013.01)
- *G06F 3/0488* (2013.01)
- *G09G 5/00* (2006.01)
- *H04N 21/482* (2011.01)
- *H04N 21/422* (2011.01)
- *G06F 3/0489* (2013.01)
- *G06F 3/02* (2006.01)
- *G06F 3/0482* (2013.01)
- *H04N 5/50* (2006.01)
- *H04N 5/445* (2011.01)

(52) U.S. Cl.
CPC .......... *G06F 3/0481* (2013.01); *G06F 3/0482* (2013.01); *G06F 3/0483* (2013.01); *G06F 3/0485* (2013.01); *G06F 3/0489* (2013.01); *G06F 3/04842* (2013.01); *G06F 3/04847* (2013.01); *G06F 3/04883* (2013.01); *G09G 5/006* (2013.01); *H04N 21/42218* (2013.01); *H04N 21/4828* (2013.01); *G09G 2300/04* (2013.01); *G09G 2354/00* (2013.01); *H04N 5/50* (2013.01); *H04N 2005/44517* (2013.01)

(58) Field of Classification Search
CPC ............... G06F 3/04847; G06F 3/0485; G06F 3/04883; G09G 5/006; G09G 2300/04; G09G 2354/00; H04N 21/42218; H04N 21/4828; H04N 5/50; H04N 2005/44517
USPC ........................................................ 345/174
See application file for complete search history.

(56) References Cited

U.S. PATENT DOCUMENTS

| | | | |
|---|---|---|---|
| 8,742,885 | B2 | 6/2014 | Brodersen et al. |
| 9,030,611 | B2 | 5/2015 | Bae |
| 2010/0277337 | A1* | 11/2010 | Brodersen ........... G06F 3/04883 340/12.54 |
| 2012/0089937 | A1* | 4/2012 | Hsieh ..................... G06F 3/0482 715/773 |
| 2012/0139689 | A1 | 6/2012 | Nakade et al. |
| 2013/0127726 | A1 | 5/2013 | Song et al. |
| 2014/0198042 | A1 | 7/2014 | Yamamoto et al. |
| 2015/0128184 | A1* | 5/2015 | Tai ...................... H04N 21/4314 725/46 |

FOREIGN PATENT DOCUMENTS

| | | | |
|---|---|---|---|
| CN | 101510973 | A | 8/2009 |
| CN | 101753878 | A | 6/2010 |
| CN | 101859215 | A | 10/2010 |
| CN | 201662508 | U * | 12/2010 |
| CN | 101968712 | A | 2/2011 |
| CN | 102111586 | A | 6/2011 |
| CN | 102456269 | A | 5/2012 |
| CN | 102460367 | A | 5/2012 |
| CN | 102841757 | A | 12/2012 |
| CN | 202662508 | U * | 1/2013 |
| CN | 103197864 | A | 7/2013 |
| CN | 103491402 | A | 1/2014 |
| CN | 103686264 | A | 3/2014 |
| CN | 203616739 | U | 5/2014 |
| CN | 103927099 | A | 7/2014 |
| CN | 203810637 | U | 9/2014 |
| CN | 104102334 | A | 10/2014 |
| CN | 104346040 | A | 2/2015 |
| KR | 10-2013-0084002 | A | 7/2013 |
| KR | 10-2014-0072482 | A | 6/2014 |

OTHER PUBLICATIONS

Notice of Transmittal of the International Search Report of PCT/CN2015/076758 in Chinese, dated Jul. 17, 2015.
Written Opinion of the International Searching Authority of PCT/CN2015/076758 in Chinese, dated Jul. 17, 2015 with English translation.
Chinese Office Action in Chinese Application No. 201410571792.8, dated Jan. 20, 2017 with English translation.
Second Chinese Office Action in Chinese Application No. 201410571792.8, dated Sep. 13, 2017 with English translation.

* cited by examiner

METHOD FOR SEARCHING INFORMATION, DISPLAY CONTROL SYSTEM AND INPUT DEVICE

CROSS REFERENCE TO RELATED APPLICATIONS

This application is the National Stage of PCT/CN2015/076758 filed on Apr. 16, 2015, which claims priority under 35 U.S.C. § 119 of Chinese Application No. 201410571792.8 filed on Oct. 23, 2014, the disclosure of which is incorporated by reference.

TECHNICAL FIELD OF THE DISCLOSURE

The present disclosure relates to the field of electronic technology, in particular, to a method for rapidly searching information, a display control system and an input device.

BACKGROUND

With continuous development of technologies, all kinds of electronic devices gradually enter into people's life, and corresponding operational applications for electronic devices also increase gradually. Usually, when a user utilizes a remote controller to adjust different channel information on an electronic device, he or she needs to repeat many steps for operation to meet the need. If the adjustment range of the channel information in which the user needs to switch, the user is required to repeat the operation of keystroke many times. This operation is very burdensome. Further, it is very inconvenient for users to operate due to too many keystrokes. Especially, for the elders, it is difficult to operate it.

SUMMARY

Embodiments of the present disclosure provide a method for rapidly searching information, a display control system and an input device, which can solve the problem that it is required to repeat the operation of keystroke many times in the case in which the operation of switching channels is performed in the existing electronic devices, make the operation simpler, bring convenience to the users, and improve the interaction capability between the users and the electronic device. At the same time, it facilitates the elders' use.

Accordingly, embodiments of the present disclosure adopt the following technical solutions.

In a first aspect, there is provided a method for rapidly searching information which can be applied to a display control system comprising an electronic device and an input device, the method comprising:

receiving a first operating instruction when the electronic device is in an operating state;

displaying a first operating page on a display screen of the electronic device according to the first operating instruction;

receiving a second operating instruction, and opening an icon corresponding to a first parameter in the first operating page according to the second operating instruction to enter a first parameter selection page, wherein the second operating instruction is generated by touching a touch key on the input device which has the same identification information as the icon corresponding to the first parameter has; and receiving a third operating instruction, and selecting an icon corresponding to a target parameter in the first parameters in the first parameter selection page according to the third operating instruction, wherein the first operating page and the first parameter selection page have the same interface information as an operating interface of the input device has.

Optionally, said receiving the third operating instruction, and selecting an icon corresponding to the target parameter in the first parameters according to the third operating instruction comprises:

receiving the third operating instruction, and switching among the first parameter selection pages according to the third operating instruction until the first parameter selection page comprises the icon of the target parameter; and receiving a first touch instruction, and selecting the icon corresponding to the target parameter according to the first touch instruction, wherein the first touch instruction is generated by touching a touch key on the input device which has the same identification information as the icon corresponding to the target parameter has.

Optionally, said receiving the third operating instruction, and switching among the first parameter selection pages according to the third operating instruction until the first parameter selection page comprises the icon of the target parameter comprises:

receiving the third operating instruction generated by sliding toward the left or the right on the input device, and switching among the first parameter selection pages according to the third operating instruction until the first parameter selection page comprises the icon of the target parameter.

Optionally, said receiving the second operating instruction, and opening the icon corresponding to the first parameter in the first operating page according to the second operating instruction to enter the first parameter selection page comprises:

receiving the second operating instruction, and switching among the first operating pages according to the second operating instruction until the first operating page comprises the icon corresponding to the first parameter; and receiving a second touch instruction, and opening the icon corresponding to the first parameter in the first operating page according to the second touch instruction to enter the first parameter selection page.

Optionally, said receiving the second operating instruction, and switching among the first operating pages according to the second operating instruction until the first operating page comprises the icon corresponding to the first parameter comprises:

receiving the second operating instruction generated by sliding toward the left or the right on the input device, and switching among the first operating pages according to the second operating instruction until the first operating page comprises the icon corresponding to the first parameter.

Optionally, when the electronic device is in a picture-playing state currently, the method further comprises:

receiving a fourth operating instruction and determining whether the fourth operating instruction meets a preset condition, wherein the fourth operating instruction is generated by sliding upward or downward on the input device; and in a case in which the fourth operating instruction meets the preset condition, adjusting a second parameter value according to the fourth operating instruction.

Optionally, the same icons in the first operating page, the first parameter selection page and the operating interface of the input device have the same color identifications, and the icons with the same color identifications have control functions corresponding to one another.

In a second aspect, there is provided a display control system comprising an electronic device and an input device, wherein the input device is used to input an operating instruction to the electronic device to control the electronic device, and the electronic device comprises:

a receiving unit used to receive at least one of a first operating instruction, a second operating instruction and a third operating instruction when the electronic device is in an operating state;

a display unit used to display a first operating page on a display screen of the electronic device according to the first operating instruction;

a processing unit used to open an icon corresponding to a first parameter according to the second operating instruction to make the display unit to display a first parameter selection page, wherein the second operating instruction is generated by touching a touch key on the input device which has the same identification information as the icon corresponding to the first parameter has; and a selection unit used to select an icon corresponding to a target parameter in the first parameters in the first parameter selection page according to the third operating instruction, wherein the first operating page and the first parameter selection page have the same interface information as an operating interface of the input device has.

Optionally, the selection unit comprises:

a switching module used to switch among the first parameter selection pages according to the third operating instruction until the first parameter selection page comprises the icon of the target parameter; and a selection module used to select the icon corresponding to the target parameter according to the first touch instruction, wherein the first touch instruction is generated by touching a touch key on the input device which has the same identification information as the icon corresponding to the target parameter has.

Optionally, the switching module is further used to:

switch among the first parameter selection pages according to the third operating instruction which is generated by sliding toward the left or the right on the input device until the first parameter selection page comprises the icon of the target parameter.

Optionally, the switching module is further used to switch among the first operating pages according to the second operating instruction until the first operating page comprises the icon corresponding to the first parameter;

the processing unit is further used to open the icon corresponding to the first parameter in the first operating page according to the second touch instruction to allow the display unit to display the first parameter selection page.

Optionally, the switching module is further used to:

switch among the first operating pages according to the second operating instruction generated by sliding toward the left or the right on the input device until the first operating page comprises the icon corresponding to the first parameter.

Optionally, the receiving unit used to receive a fourth operating instruction and determine whether the fourth operating instruction meets a preset condition, wherein the fourth operating instruction is generated by sliding upward or downward on the input device.

The display control system further comprises an adjusting unit used to adjust a second parameter value when the fourth operating instruction meets the preset condition.

Optionally, the same icons in the first operating page, the first parameter selection page and the operating interface of the input device have the same color identifications, and the icons with the same color identifications have control functions corresponding to one another.

In a third aspect, there is provided an input device comprising indicator lights, a control chip, a circuit board, an optical isolation layer, a silk-screen layer, a touch layer and function keys, wherein the optical isolation layer is arranged between the indicator lights, and used to isolate the light rays emitted by each of the indicator lights such that the light rays emitted by the indicator lights do not interfere with each other;

the silk-screen layer is arranged over the indicator lights, there are different pieces of identification information on the silk-screen layer, and different pieces of identification information have one-to-one relationship with the indicator lights;

the touch layer is arranged over the silk-screen layer, the function keys are arranged on the touch layer, and the touch layer is used to touch control according to the arrangement manner of the function keys; and the control chip and the indicator lights are arranged on the circuit board, and used to implement the one-to-one control relationship between the indicator lights, the silk-screen layer and the function keys under the control of the control chip.

Optionally, the input device further comprises a protection glass and a housing, wherein the protection glass is arranged on top of the touch layer, and used to protect the touch layer; and the housing is used to make the input device as an enclosed apparatus.

Optionally, the touch layer is a capacitive touch layer.

Optionally, the identification information on the silk-screen layer comprises numbers, icons or letters.

In the method for rapidly searching information, the display control system and the input device provided by an embodiment of the present disclosure, receiving a first operating instruction when the electronic device is in an operating state, displaying a first operating page on a display screen of the electronic device according to the first operating instruction, receiving a second operating instruction and opening an icon corresponding to a first parameter on the first operating page according to the second operating instruction to enter a first parameter selection page, and receiving a third operating instruction and selecting an icon corresponding to a target parameter in the first parameters on the first parameter selection page according to the third operating instruction, when a user performs channel switching, he only needs to enter the first operating page first, find an icon corresponding to a video on the first operating page and click the icon to enter the first parameter selection page, and then find an icon of the corresponding channel on the first parameter selection page and click the icon, such that the pictures to be played by the channel can be displayed on the display screen of the electronic device. It solves the problem that it is required to repeat the operation of pressing keys many times in the case in which the channel switching is performed by the existing electronic device, makes the operation simpler, brings convenience to the users, and improves the interaction capability between the users and the electronic device. At the same time, it facilitates the elders' use.

BRIEF DESCRIPTION OF THE DRAWINGS

In order to describe embodiments of the present disclosure or known technical solutions more clearly, the drawings required to be used in the description of the embodiments and the known technical solutions are briefly introduced in the following. Obviously, the drawings in the following description are only some embodiments of the present disclosure. Those skilled in the art can obtain other drawings based on those drawings without creative work.

DETAILED DESCRIPTION

In the following, technical solutions in embodiments of the present disclosure will be clearly and completely described in connection with figures. Obviously, the described embodiments are only part of embodiments of the present disclosure, rather than all the embodiments. Based on the embodiments in the present disclosure, all other embodiments obtained by those skilled in the art without creative work all belong to the protection scope of the present disclosure.

Figure 1:
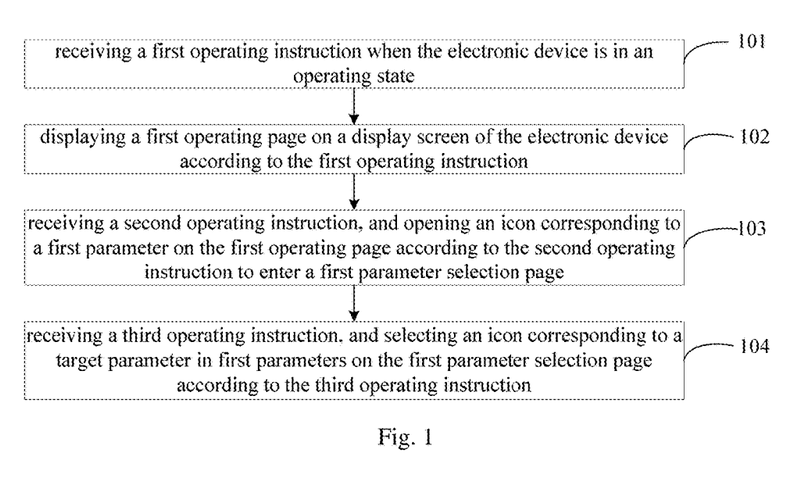
FIG. 1 is a schematic flowchart of a method for rapidly searching information provided by an embodiment of the present disclosure.

An embodiment of the present disclosure provides a method for rapidly searching information, which can be applied to a display control system comprising an electronic device and an input device. As shown in FIG. 1, the method comprises the following steps.

At 101, a first operating instruction is received when the electronic device is in an operating state.

In particular, the first operating instruction can be generated by touching a main key on the input device.

At 102, a first operating page is displayed on a display screen of the electronic device according to the first operating instruction.

In particular, after the electronic device received the first operating instruction, a processor inside the electronic device will analyze the first operating instruction, give a command to open the first operating page, and accordingly display the first operating page on the display screen of the electronic device.

At 103, a second operating instruction is received, and an icon corresponding to a first parameter in the first operating page is opened according to the second operating instruction to enter a first parameter selection page.

Optionally, the second operating instruction is generated by touching a touch key on the input device which has the same identification information as the icon corresponding to the first parameter has.

In particular, the user determines whether there is an icon corresponding to the first parameter on the first operating page as currently displayed. If no, an instruction to switch among the first operating pages will be sent to the electronic device to switch among the first operating pages until an icon corresponding to the first parameter is found. Then, an instruction to open the icon corresponding to the first parameter will be sent. The electronic device opens the icon corresponding to the first parameter according to the instruction to enter the first parameter selection page, and display the same on the display screen of the electronic device. If there exists an icon corresponding to the first parameter on the first operating page as currently displayed in the electronic device, the user directly sends an instruction to open the icon corresponding to the first parameter. The electronic device opens the icon corresponding to the first parameter according to the instruction to enter the first parameter selection page, and display the same on the display screen of the electronic device.

At 104, a third operating instruction is received, and an icon corresponding to a target parameter among first parameters is selected on the first parameter selection page according to the third operating instruction.

Optionally, the first operating page and the first parameter selection page have the same interface information as an operating interface of the input device.

In particular, the user would determine whether there is an icon of the target parameter in the first parameter selection page currently displayed in the electronic device. If no, the first parameter selection page is switched according to the third operating instruction until the icon of the target parameter is found. Then the electronic device receives an instruction to open the icon of the target parameter, and opens the icon of the target parameter according to the instruction to enter a picture-playing page. If there is the icon of the target parameter in the first parameter selection page displayed currently in the electronic device, the electronic device directly opens the icon of the target parameter according to the third operating instruction to enter a picture-playing page. If there is no icon of the target parameter in the first parameter selection page currently displayed in the electronic device, the electronic device will perform page switching until there is an icon of the target parameter in the currently displayed page.

In the method for rapidly searching information provided by an embodiment of the present disclosure, by receiving a first operating instruction when the electronic device is in an operating state, displaying a first operating page on a display screen of the electronic device according to the first operating instruction, receiving a second operating instruction and opening an icon corresponding to a first parameter on the first operating page according to the second operating instruction so as to enter a first parameter selection page, and receiving a third operating instruction and selecting an icon corresponding to a target parameter in the first parameters on the first parameter selection page according to the third operating instruction, when a user performs channel switching, he only needs to enter the first operating page first, find an icon corresponding to a video on the first operating page and click the icon to enter the first parameter selection page, and then find an icon of the corresponding channel on the first parameter selection page and click the icon, such that the pictures of the channel can be displayed on the display screen of the electronic device. It solves the problem that repeating the operation of pressing keys many times is needed in the case in which the existing electronic devices are used for channel switching, makes the operation simpler, facilitates the operation of the users, and improves the interaction capability between the users and the electronic device. At the same time, it facilitates the elders' use.

Figure 2:
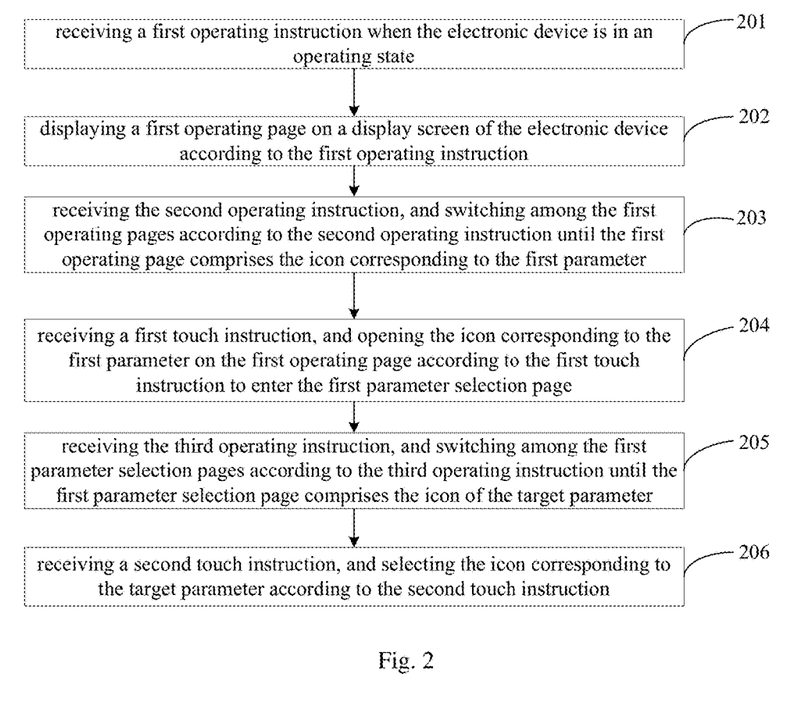
FIG. 2 is a schematic flowchart of another method for rapidly searching information provided by an embodiment of the present disclosure.

An embodiment of the present disclosure provides a method for rapidly searching information, which can be applied to a display control system comprising an electronic device and an input device. As shown in FIG. 2, the method comprises the following steps.

At 201, a first operating instruction is received when the electronic device is in an operating state.

In particular, the first operating instruction can be generated by touching a main key on the input device. The main key on the input device has the highest priority. Whatever display interface in which the electronic device is currently, as long as the main key is triggered, the electronic device will jump to the interface of the main page automatically. In the present embodiment, the input device can be a remote controller.

At 202, a first operating page is displayed on a display screen of the electronic device according to the first operating instruction.

In particular, when the first operating page of the electronic device has only one page, the first operating page is the main page of the electronic device. If the first operating page of the electronic device comprises multiple pages, the first page of the multiple operating pages is the main page. Optionally, the first operating page can be displayed on the electronic device in full screen. In such a way, the elders, when using the electronic device, can easily and clearly recognize information of respective icons on the first operating page.

In particular, receiving a second operating instruction, and opening an icon corresponding to a first parameter on the first operating page according to the second operating instruction to enter a first parameter selection page can comprise steps 203~204.

At 203, the second operating instruction is received, and the first operating page is switched according to the second operating instruction until the first operating page comprises the icon corresponding to the first parameter.

In particular, step 203 can be implemented as follows: receiving the second operating instruction which is generated by sliding toward the left or the right on the input device, and switching among the first operating pages according to the second operating instruction until the first operating page comprises the icon corresponding to the first parameter.

When the user performs an operation of sliding toward the left or the right on the input device, the display on the corresponding electronic device also switches between different first operating pages. For example, taking the case in which the electronic device is a television and the input device is a remote controller as an example for illustration, when the user finds that there is no icon corresponding to the first parameter on the first operating page currently displayed on the television after the first operating page (usually, the first one of the first operating pages is entered as default) is entered, the user performs the operation of sliding toward the left on the remote controller, and at the same time, the display on the television will be switched to the second page of the first operating pages. If the second page has no icon of the first parameter, either, the user continues to perform the operation of sliding to the left on the remote controller until the page displayed on the television has the icon of the first parameter.

At 204, a first touch instruction is received, and the icon corresponding to the first parameter on the first operating page is opened according to the first touch instruction to enter the first parameter selection page.

After the page displayed on the electronic device contains the icon corresponding to the first parameter, the user sends the first touch instruction by touching a key on the input device which has the same identification information as the icon corresponding to the first parameter has. After the electronic device receives the first touch instruction, it performs instruction information recognition and opens an application of the icon corresponding to the first parameter to enter the first parameter selection page.

In particular, receiving a third operating instruction and selecting an icon corresponding to a target parameter in the first parameters according to the third operating instruction can comprise steps 205~206.

At 205, the third operating instruction is received, and the first parameter selection page is switched according to the third operating instruction until the first parameter selection page comprises the icon of the target parameter.

In particular, step 205 can be performed by receiving the third operating instruction generated by sliding toward the left or the right on the input device and switching among the first parameter selection pages according to the third operating instruction until the first parameter selection page comprises the icon of the target parameter.

When the first parameter selection page displayed currently on the electronic device has no icon corresponding to the target parameter, the user is required to send an instruction to perform switching between pages for the first parameter selection page. When the user slides toward the left or the right on the input device, the display on the corresponding electronic device also switches between different first selection pages. For example, if the electronic device is a television and the input device is a remote controller, when the user finds that there is no icon of the target parameter on the first selection page currently displayed on the television when entering the first selection page (usually, the default first selection page is the first one of the first selection pages), the user performs the operation of sliding toward the left on the remote controller, and at the same time, the display on the television will switch to the second page of the first selection pages. If the second page has no icon of the target parameter, either, the user continues to perform the operation of sliding to the left on the remote controller until the page displayed on the television has the icon of the target parameter.

At 206, a second touch instruction is received, and the icon corresponding to the target parameter is selected according to the second touch instruction.

The second touch instruction is generated by touching a key on the input device which has the same identification information as the icon corresponding to the target parameter has.

After the first selection page currently displayed on the electronic device has the icon corresponding to the target parameter, the user sends the second touch instruction by touching a key on the input device which has the same identification information as the icon corresponding to the target parameter has. After the electronic device receives the second touch instruction, it opens an application of the icon corresponding to the target parameter according to the instruction information to enter the picture-playing state.

Optionally, the same icons in the first operating page, the first parameter selection page and the operating interface of the input device have the same color identifications, and the icons with the same color identifications have control functions corresponding to one another.

It is noted that the identification information on the display interface of the electronic device and the identification information on the keys of the input device can be color identification. As such, the user can easily and rapidly find corresponding keys according to the colors. At the same time, the display interface on the television device can be a full screen display to facilitate the elders' use. When the elder uses the device, he can trigger the icons as desired by touching the key with the same color as the big icon on the television. For the electronic device provided in an embodiment, it is possible to realize the searching and switching of the information required by the user by simple sliding and touching operations on the input device, thus the use being very easy and convenient. Of course, it is only an illustration that the identification information can be color information in the present embodiment, and it is not limited that the identification information can only be color information. Any information that is easy to be found can be identification information.

Figure 3:
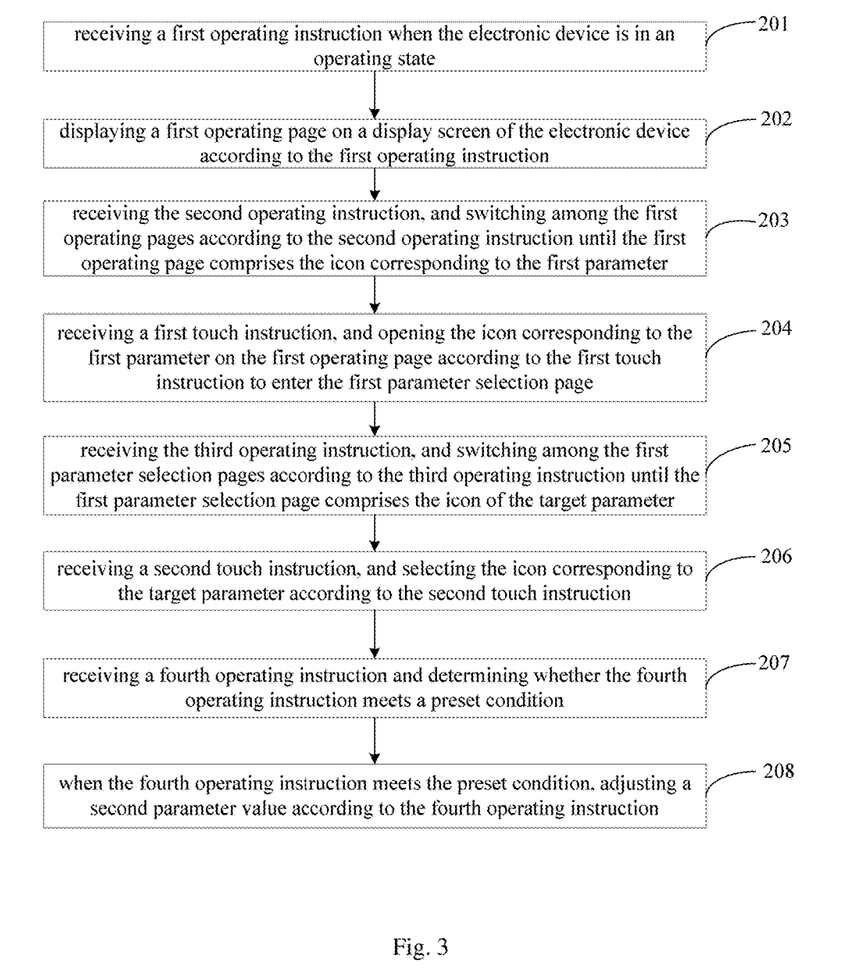
FIG. 3 is a schematic flowchart of yet another method for rapidly searching information provided by an embodiment of the present disclosure.

Further, as shown in FIG. 3, when the electronic device is currently in the picture-playing state, the method can further comprise the following steps.

At 207, a fourth operating instruction is received and it is determined whether the fourth operating instruction meets a preset condition.

Optionally, the fourth operating instruction is generated by sliding upward or downward on the input device.

In particular, in the present embodiment, determining whether the fourth operating instruction meets a preset condition can be implemented by determining whether the fourth operating instruction is an instruction for adjusting the extent information such as color, brightness, sound or the like. If the fourth operating instruction is an adjustment instruction for the extent information of color, brightness, sound or the like, the fourth operating instruction meets the present condition. If the fourth operating instruction is not an adjustment instruction for the extent information of color, brightness, sound or the like, the fourth operating instruction does not meet the present condition.

At 208, when the fourth operating instruction meets the preset condition, a second parameter value is adjusted according to the fourth operating instruction.

In particular, it is possible to adjust corresponding information of the electronic device by sliding upward or downward on the input device. For example, when it is needed to adjust the sound, in a case in which it is required to increase the volume, it is only to perform the operation of sliding upward on the input device so as to increase the volume. The operation is convenient and simple, and the efficiency is improved dramatically.

The shape of the icon on the display interface in the present embodiment is not limited herein. Icons with any shape are possible. At the same time, preferably, the display interface on the electronic device and the interface of the functional keys on the input device can use the mode of a 3*3 pattern, which is more suitable to user's habit, and is benefit for the users. However, other patterns which are convenient to operations are also applicable.

In the method for rapidly searching information provided by an embodiment of the present disclosure, by receiving a first operating instruction when the electronic device is in an operating state, displaying a first operating page on a display screen of the electronic device according to the first operating instruction, receiving a second operating instruction and opening an icon corresponding to a first parameter in the first operating page according to the second operating instruction to enter a first parameter selection page, and receiving a third operating instruction and selecting an icon corresponding to a target parameter in the first parameters in the first parameter selection page according to the third operating instruction, when a user performs channel switching, he only needs to enter the first operating page first, find an icon corresponding to a video in the first operating page and click the icon to enter the first parameter selection page, and then find an icon of the corresponding channel in the first parameter selection page and click the same, such that the pictures to be played by the channel can be displayed on the display screen of the electronic device. It solves the problem that it is needed to repeat the operation of pressing keys many times when existing electronic devices are used for channel switching, makes the operation simpler, brings convenience to the users, and improves the interaction capability between the users and the electronic device. At the same time, it facilitates the elders' use.

Figure 4:
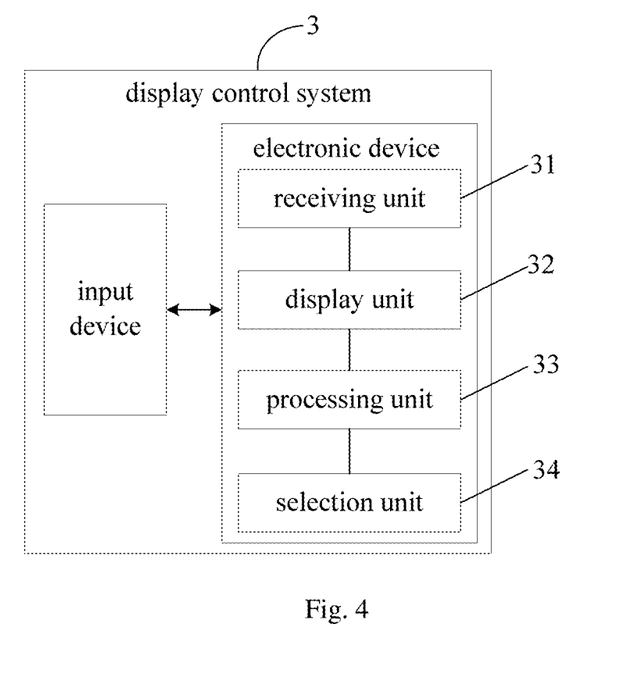
FIG. 4 is a schematic structural diagram of a display control system provided by an embodiment of the present disclosure.

An embodiment of the present disclosure provides a display control system 3. The display control system 3 comprises an electronic device and an input device. As shown in FIG. 4, the input device is used to input an operating instruction to control the electronic device, and the electronic device comprises a receiving unit 31, a display unit 32, a processing unit 33 and a selection unit 34.

The receiving unit 31 is used to receive at least one of a first operating instruction, a second operating instruction and a third operating instruction when the electronic device is in an operating state.

The display unit 32 is used to display a first operating page on a display screen of the electronic device according to the first operating instruction.

The processing unit 33 is used to open an icon corresponding to a first parameter according to the second operating instruction to make the display unit to display a first parameter selection page.

Optionally, the second operating instruction is generated by touching a touch key on the input device which has the same identification information as the icon corresponding to the first parameter has.

The selection unit 34 is used to select an icon corresponding to a target parameter in the first parameters in the first parameter selection page according to the third operating instruction.

Optionally, the first operating page and the first parameter selection page have the same interface information as an operating interface of the input device.

In the display control system provided by an embodiment of the present disclosure, by receiving a first operating instruction when the electronic device is in an operating state, displaying a first operating page on a display screen of the electronic device according to the first operating instruction, receiving a second operating instruction and opening an icon corresponding to a first parameter in the first operating page according to the second operating instruction to enter a first parameter selection page, and receiving a third operating instruction and selecting an icon corresponding to a target parameter in the first parameters in the first parameter selection page according to the third operating instruction, when a user performs channel switching, he only needs to enter the first operating page firstly, find an icon corresponding to a video in the first operating page and click the icon to enter the first parameter selection page, and then find an icon of the corresponding channel in the first parameter selection page and click the icon, such that the pictures to be played by the channel can be displayed on the display screen of the electronic device. It solves the problem that it is needed to repeat the operation of pressing keys many times when the channel switching is performed in the existing electronic device, makes the operation simpler, brings convenience to the users, and improves the interaction capability between the users and the electronic device. At the same time, it facilitates the elders' use.

Figure 5:
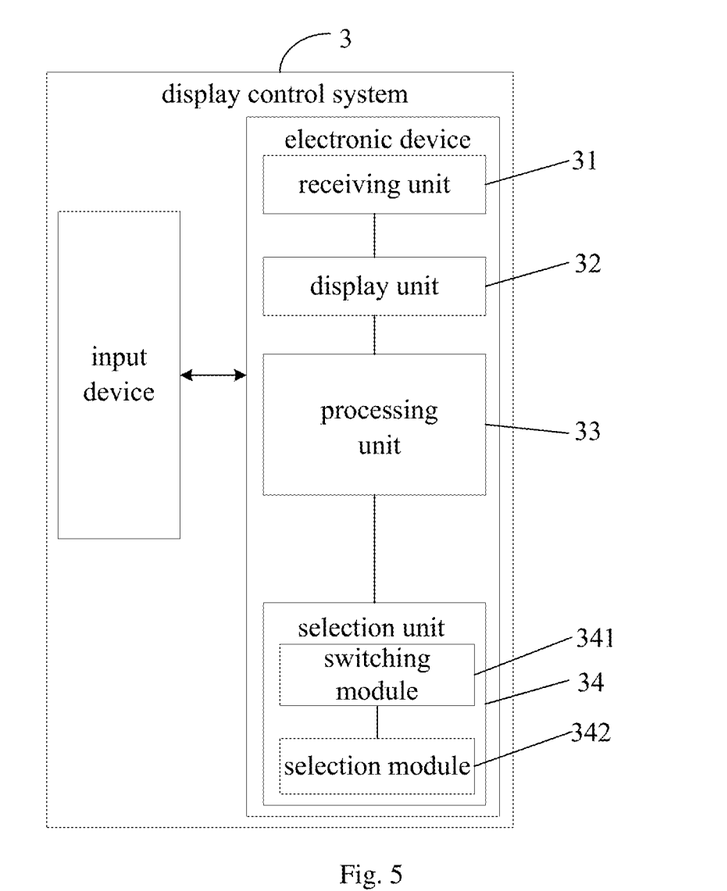
FIG. 5 is a schematic structural diagram of another display control system provided by an embodiment of the present disclosure.

Optionally, as shown in FIG. 5, the selection unit 34 comprises a switching module 341 and a selection module 342.

The switching module 341 is used to switch among the first parameter selection pages according to the third operating instruction until the first parameter selection page comprises the icon of the target parameter.

The selection module 342 is used to select the icon corresponding to the target parameter according to the second touch instruction.

Optionally, the second touch instruction is generated by touching a touch key on the input device which has the same identification information as the icon corresponding to the target parameter has.

Optionally, the switching module 342 is also used to switch among the first parameter selection pages according to the third operating instruction generated by sliding toward the left or the right on the input device until the first parameter selection page comprises the icon of the target parameter.

Optionally, the switching module 341 is also used to switch among the first operating pages according to the second operating instruction until the first parameter selection page comprises the icon corresponding to the first parameter.

Optionally, the processing unit 33 is also used to open the icon corresponding to the first parameter in the first operating page according to the first touch instruction to make the display unit to display the first parameter selection page.

Optionally, the switching module 341 is also used to switch among the first operating pages according to the second operating instruction generated by sliding toward the left or the right on the input device until the first operating page comprises the icon corresponding to the first parameter.

Figure 6:
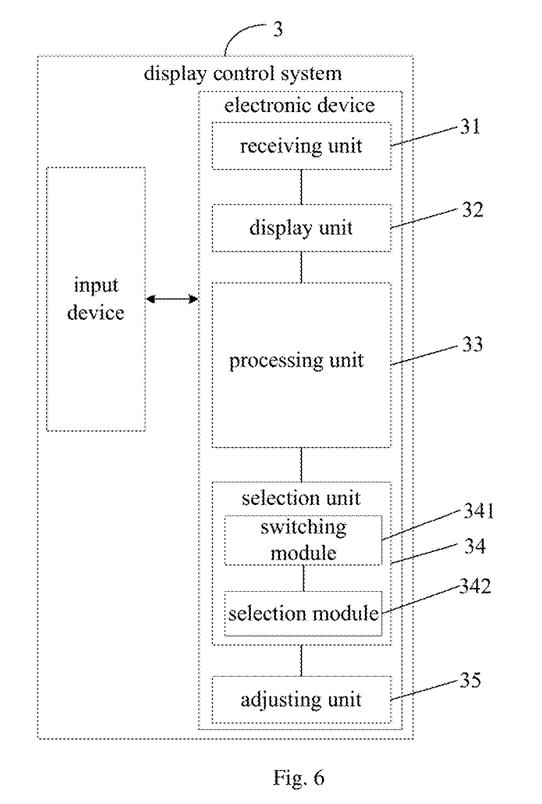
FIG. 6 is a schematic structural diagram of yet another display control system provided by an embodiment of the present disclosure.

Optionally, as shown in FIG. 6, the electronic device 3 further comprises an adjusting unit 35.

The receiving unit 31 is also used to receive a fourth operating instruction and determine whether the fourth operating instruction meets a preset condition.

Optionally, the fourth operating instruction is generated by sliding upward or downward on the input device.

The adjusting unit 35 is used to adjust a second parameter value according to the fourth operating instruction when the fourth operating instruction meets the preset condition.

Optionally, the same icons in the first operating page, the first parameter selection page and the operating interface of the input device have the same color identifications, and the icons with the same color identifications have control functions corresponding to one another.

In the display control system provided by an embodiment of the present disclosure, by receiving a first operating instruction when the electronic device is in an operating state, displaying a first operating page on a display screen of the electronic device according to the first operating instruction, receiving a second operating instruction and opening an icon corresponding to a first parameter in the first operating page according to the second operating instruction to enter a first parameter selection page, and receiving a third operating instruction and selecting an icon corresponding to a target parameter in the first parameters in the first parameter selection page according to the third operating instruction, when a user performs channel switching, he only needs to enter the first operating page firstly, find an icon corresponding to a video in the first operating page and click the icon to enter the first parameter selection page, and then find an icon of the corresponding channel in the first parameter selection page and click the icon, such that the pictures to be played by the channel can be displayed on the display screen of the electronic device. It solves the problem that it is needed to repeat the operation of pressing keys many times when the channel switching is performed in the existing electronic device, which makes the operation simpler, brings convenience to the users, and improves the interaction capability between the users and the electronic device. At the same time, it facilitates the elders' use.

Figure 7:
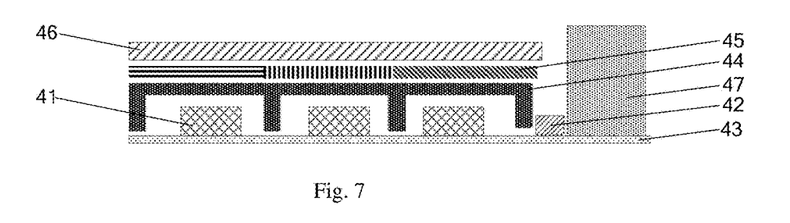
FIG. 7 is a schematic diagram of an internal structure of an input device provided by an embodiment of the present disclosure.

An embodiment of present disclosure provides an input device 4. As illustrated in FIG. 7, the input device 4 comprises indicator lights 41, a control chip 42, a circuit board 43, an optical isolation layer 44, a silk-screen layer 45, a touch layer 46, function keys (not shown in the figure) and a main key 47.

The optical isolation layer 44 is arranged between the indicator lights 44, and used to isolate the light rays emitted by each of the indicator lights 41 such that the light rays emitted by the indicator lights 41 do not interfere with each other.

The silk-screen layer 45 is arranged above the indicator lights 41; there are different pieces of identification information on the silk-screen layer 45, and different pieces of identification information have one-to-one relationship with the indicator lights 41.

The touch layer 46 is arranged on the silk-screen layer 45, and the function keys are arranged on the touch layer 46; the touch control can be performed on the touch layer 46 according to the arrangement manner of the function keys.

The control chip 42 and the indicator lights 41 are arranged on the circuit board 43, and the one-to-one control relationship between the indicator lights 41, the identification information on the silk-screen layer 45 and the function keys can be implemented under the control of the control chip 42.

By light sources with different colors provided the indicator lights, it is possible to provide the function keys on the input device with identification information with various different colors to facilitate recognition. Alternatively, it is also possible to arrange various different colors on the silk-screen layer in advance and then illuminate the silk-screen layer with the white light source emitted by the indicator light so as to make the function keys on the input device have identification information with various different colors. Nevertheless, the above are only examples to explain the manner for generating the identification information on the function keys, but do not limit the manner in any way.

Figure 8:
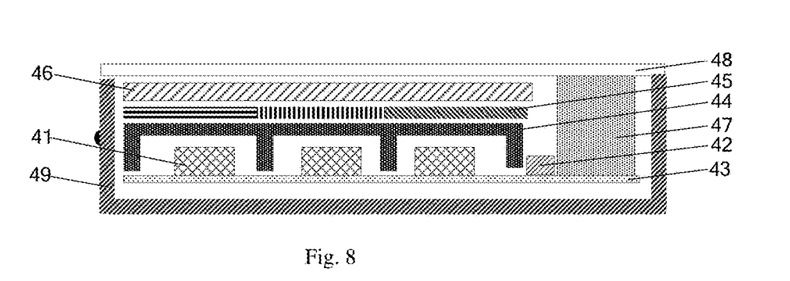
FIG. 8 is a schematic diagram of an internal structure of another input device provided by an embodiment of the present disclosure.

Further, as illustrated in FIG. 8, the input device 4 further comprises protection glass 48 and a housing 49.

The protection glass 48 is arranged over the touch layer 46 for protecting the touch layer 46.

The housing 49 is used to make the input device as an enclosed apparatus.

Optionally, the touch layer can be a capacitive touch layer.

Optionally, the identification information on the silk-screen layer can comprise numbers, icons or letters.

Figure 9:
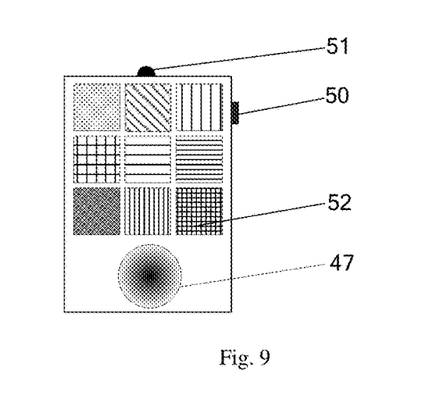
FIG. 9 is a schematic diagram of an external structure of an input device provided by an embodiment of the present disclosure.

The main key 47 in the present embodiment can be Home key. The main key 47 has the highest priority. Whatever application the electronic device is in currently, as long as the operating instruction for the main key 47 is received, the electronic device will display the operating interface of the main page. In particular, as illustrated in FIG. 9, the input device can also have a power switch 50 and an infrared emitter 51; the function keys 52 on the input device can be arranged in a 3*3 pattern, and are distributed in the center area of the input device. The area where the whole keys are located can have touch functions. The main key 47 (i.e. Home key) is arranged in the center position on the bottom of the input device. Of course, the function keys 52 of the input device can also be arranged in the pattern of 4*4 or 3*3 or any other manner which is easy to be realized and operated. The power switch 50 is used to turn on or off the input device. The infrared emitter 51 can emit the trigger instruction to the electronic device which is generated after the user triggers a key on the input device.

Optionally, the input device in the present embodiment can be a normal remote controller or any other remote controller that can perform a remote control. In the input device provided by an embodiment of the present disclosure, by configuring that the input device has the same operating interface as the display interface of the page on the screen of the electronic device, and that the keys on the input device have the same identification information as the icons on the display interface of the electronic device have, and that the key and the icon with the same identification information have one-to-one control relationship, when a user performs the channel switching, he only needs to use the input device to open the main page on the electronic device and finds the corresponding icon to be adjusted on the main page, and performs the touch operation on the corresponding keys on the input device, and then he can see the respective channel information and find the desired channel by sliding the pages on the input device, and touches the key corresponding to the icon of the desired channel on the input device so that the pictures of the channel can be displayed on the display screen of the electronic device. It solves the problem that it is needed to repeat the operation of pressing keys many times when the channel switching is performed in the existing electronic devices, and it makes the operation simpler, brings convenience to the users, and improves the interaction capability between the users and the electronic device. At the same time, it facilitates the elders' use.

It can be understood by those skilled in the art that all or part of the steps to implement the above methods can be realized by program instructing related hardware, the program can be stored in a computer-readable storage medium, and the program, when is executed, performs the steps of embodiments of the above methods. The storage medium can be any medium that can store program codes, including ROM, RAM, magnetic disk, optical disk or the like.

The above descriptions are only specific implementations of the present disclosure, but the protection scope of the present disclosure is not limited to this. Modifications or replacements that can be easily devised by those skilled in the art within the technical scope of the present disclosure should all fall within the protection scope of the present disclosure. Therefore, the protection scope of the present disclosure should be defined by the protection scope of the claims.

The present application claims the priority of Chinese Patent Application No. 201410571792.8 filed on Oct. 23, 2014, the entire content of which is incorporated as part of the present disclosure by reference.

What is claimed is:

1. A method for rapidly searching information, which is applied to a display control system comprising an electronic device and an input device equipped with a main key, the method comprising:
   receiving a first operating instruction when the electronic device is in an operating state;
   displaying a first operating page on a display screen of the electronic device according to the first operating instruction;
   receiving a second operating instruction, and opening an icon corresponding to a first parameter in the first operating page according to the second operating instruction to enter a first parameter selection page, wherein the second operating instruction is generated by touching a touch key on the input device which has the same identification information as the icon corresponding to the first parameter has; and
   receiving a third operating instruction, and selecting an icon corresponding to a target parameter in the first parameters on the first parameter selection page according to the third operating instruction, wherein the third operating instruction is generated by sliding toward the left or the right on the input device;
   wherein the first operating page and the first parameter selection page have the same interface information as an operating interface of the input device;
   wherein the electronic device is configured to jump to an interface of a main page automatically if the main key is touched;
   wherein the first operating instruction is generated by touching the main key on the input device.

2. The method according to claim 1, wherein said receiving the third operating instruction, and selecting the icon corresponding to the target parameter in the first parameters on the first parameter selection page according to the third operating instruction comprises:
   receiving the third operating instruction, and switching among the first parameter selection pages according to the third operating instruction until the first parameter selection page comprises the icon of the target parameter; and
   receiving a first touch instruction, and selecting the icon corresponding to the target parameter according to the first touch instruction, wherein the first touch instruction is generated by touching a touch key on the input device which has the same identification information as the icon corresponding to the target parameter has.

3. The method according to claim 2, wherein said receiving the third operating instruction, and switching among the first parameter selection pages according to the third operating instruction until the first parameter selection page comprises the icon of the target parameter comprises:
   receiving the third operating instruction generated by sliding toward the left or the right on the input device, and switching among the first parameter selection pages according to the third operating instruction until the first parameter selection page comprises the icon of the target parameter.

4. The method according to claim 1, wherein said receiving the second operating instruction, and opening an icon corresponding to the first parameter on the first operating page according to the second operating instruction to enter the first parameter selection page comprises:
   receiving the second operating instruction, and switching among the first operating pages according to the second operating instruction until the first operating page comprises the icon corresponding to the first parameter; and
receiving a second touch instruction, and opening the icon corresponding to the first parameter on the first operating page according to the second touch instruction to enter the first parameter selection page.

5. The method according to claim 4, wherein said receiving the second operating instruction, and switching among the first operating pages according to the second operating instruction until the first operating page comprises the icon corresponding to the first parameter comprises:
receiving the second operating instruction generated by sliding toward the left or the right on the input device, and switching among the first operating pages according to the second operating instruction until the first operating page comprises the icon corresponding to the first parameter.

6. The method according to claim 1, wherein when the electronic device is in a picture-playing state currently, the method further comprises:
receiving a fourth operating instruction and determining whether the fourth operating instruction meets a preset condition, wherein the fourth operating instruction is generated by sliding upward or downward on the input device; and
when the fourth operating instruction meets the preset condition, adjusting a second parameter value according to the fourth operating instruction.

7. The method according to claim 1, wherein
same icons on the first operating page, the first parameter selection page and the operating interface of the input device have same color identifications, and icons with the same color identifications have control functions corresponding to one another.

8. A display control system comprising an electronic device and an input device, wherein the input device is configured to input an operating instruction to control the electronic device and is equipped with a main key, and the electronic device comprises:
a receiving unit configured to receive at least one of a first operating instruction, a second operating instruction and a third operating instruction when the electronic device is in an operating state;
a display unit configured to display a first operating page on a display screen of the electronic device according to the first operating instruction;
a processing unit configured to open an icon corresponding to a first parameter according to the second operating instruction to make the display unit display a first parameter selection page, wherein the second operating instruction is generated by touching a touch key on the input device which has the same identification information as the icon corresponding to the first parameter has; and
a selection unit configured to select an icon corresponding to a target parameter in the first parameters on the first parameter selection page according to the third operating instruction, wherein the third operating instruction is generated by sliding toward the left or the right on the input device;
wherein the first operating page and the first parameter selection page have same interface information as an operating interface of the input device has;
wherein the electronic device is configured to jump to an interface of a main page automatically if the main key is touched;
wherein the first operating instruction is generated by touching the main key on the input device.

9. The display control system according to claim 8, wherein the selection unit comprises:
a switching module configured to switch among the first parameter selection pages according to the third operating instruction until the first parameter selection page comprises the icon of the target parameter; and
a selection module configured to select the icon corresponding to the target parameter according to the first touch instruction, wherein the first touch instruction is generated by touching a touch key on the input device which has the same identification information as the icon corresponding to the target parameter has.

10. The display control system according to claim 9, wherein the switching module is further configured to:
switch among the first parameter selection pages according to the third operating instruction generated by sliding toward the left or the right on the input device until the first parameter selection page comprises the icon of the target parameter.

11. The display control system according to claim 9, wherein the switching module is further configured to switch among the first operating pages according to the second operating instruction until the first operating page comprises the icon corresponding to the first parameter;
the processing unit is further configured to open the icon corresponding to the first parameter on the first operating page according to the second touch instruction to make the display unit display the first parameter selection page.

12. The display control system according to claim 11, wherein the switching module is further configured to:
switch among the first operating pages according to the second operating instruction generated by sliding toward the left or the right on the input device until the first operating page comprises the icon corresponding to the first parameter.

13. The display control system according to claim 8, wherein
the receiving unit configured to receive a fourth operating instruction and determine whether the fourth operating instruction meets a preset condition, wherein the fourth operating instruction is generated by sliding upward or downward on the input device.

14. The display control system according to claim 13, further comprising an adjusting unit configured to adjust a second parameter value according to the fourth operating instruction in a case in which the fourth operating instruction meets the preset condition.

15. The display control system according to claim 8, wherein
same icons in the first operating page, the first parameter selection page and the operating interface of the input device have same color identifications, and icons with the same color identifications have control functions corresponding to one another.

16. An input device for remote controlling an electronic device, the input device comprising indicator lights, a control chip, a circuit board, an optical isolation layer, a silk-screen layer, a touch layer and function keys, wherein
the optical isolation layer is arranged between the indicator lights, and configured to isolate light rays emitted by each of the indicator lights such that the light rays emitted by the indicator lights do not interfere with each other;

the silk-screen layer is arranged over the indicator lights, there are different pieces of identification information on the silk-screen layer, and different pieces of identification information have one-to-one relationship with the indicator lights;

the touch layer is arranged over the silk-screen layer, the function keys are arranged on the touch layer, and the touch layer is configured to perform touch control according to the arrangement manner of the function keys; and the control chip and the indicator lights are arranged on the circuit board, and configured to implement one-to-one control relationship between the indicator lights, the silk-screen layer and the function keys by control;

wherein the input device is equipped with a main key, and the main key is configured to, upon being touched, trigger a electronic device to jump to an interface of a main page automatically;

wherein a first operating instruction is generated by touching the main key on the input device so as to trigger the electronic device to display a first operating page;

a second operating instruction is generated by touching a touch key on the input device so as to display a first parameter selection page on a display of the electronic device; and a third operating instruction is generated by sliding toward the left or the right on the input device so as to select an icon corresponding to a target parameter in the first parameters on the first parameter selection page.

17. The input device according to claim 16, wherein the input device further comprises a protection glass and a housing, wherein the protection glass is arranged on top of the touch layer, and configured to protect the touch layer; and the housing is configured to make the input device as an enclosed apparatus.

18. The input device according claim 16, wherein the touch layer is a capacitive touch layer.

19. The input device according claim 16, wherein the identification information on the silk-screen layer comprises numbers, icons or letters.

\* \* \* \* \*